(12) United States Patent
Samuel et al.

(10) Patent No.: US 10,320,795 B2
(45) Date of Patent: Jun. 11, 2019

(54) CONTEXT-AWARE DEVICE PERMISSIONING FOR HIERARCHICAL DEVICE COLLECTIONS

(71) Applicant: Microsoft Technology Licensing, LLC, Redmond, WA (US)

(72) Inventors: Arjmand Samuel, Redmond, WA (US); Juan Perez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 15/436,288

(22) Filed: Feb. 17, 2017

(65) Prior Publication Data

US 2018/0241749 A1 Aug. 23, 2018

(51) Int. Cl.
*G06F 17/30* (2006.01)
*H04L 29/06* (2006.01)
(Continued)

(52) U.S. Cl.
CPC .......... *H04L 63/10* (2013.01); *H04L 63/0876* (2013.01); *H04L 67/12* (2013.01);
(Continued)

(58) Field of Classification Search
CPC ......... G06F 21/6218; G06F 2221/2149; H04L 12/2803; H04L 63/065; H04L 63/20; H04L 67/1068; H04L 67/16; H04L 63/0876; H04L 63/10; H04L 67/12; H04W 12/04; H04W 12/08; H04W 4/70; H04W 12/06; H04W 4/02
See application file for complete search history.

(56) References Cited

U.S. PATENT DOCUMENTS

2013/0173621 A1 7/2013 Kapoor et al.
2014/0241354 A1* 8/2014 Shuman .................. H04L 67/16
370/390
2014/0244836 A1 8/2014 Goel et al.

FOREIGN PATENT DOCUMENTS

WO 2016172237 A1 10/2016

OTHER PUBLICATIONS

Uominen, Ilpo, "Access Control for Internet of Things", Retrieved From: https://www.intopalo.com/blog/2015-05-5-access-control-for-internet-of-things/, Retrieved Date: May 15, 2018, 4 Pages. (Year: 2015).*

(Continued)

*Primary Examiner* — Abiy Getachew
(74) *Attorney, Agent, or Firm* — David Chin; Chin IP, PLLC

(57) ABSTRACT

Metadata associated with IoT devices is stored. The metadata may include categories associated with the IoT devices. At least a first category may be hierarchical such that the first category includes at least two hierarchical levels, with each hierarchical level including at least two categories, and such that each category in a hierarchical level that is below another hierarchical level is a subset of one of the categories in the hierarchical levels above that hierarchical level. User information associated with users is stored. A request associated with one of the users and further associated with access to at least one of the IoT devices is received. Responsive to the request, the access is selectively granted to the at least one of the IoT devices based upon the stored user information and the stored metadata.

17 Claims, 5 Drawing Sheets

(51) Int. Cl.
  H04W 12/08 (2009.01)
  H04W 12/06 (2009.01)
  H04W 4/70 (2018.01)
  H04L 29/08 (2006.01)
  H04W 4/02 (2018.01)

(52) U.S. Cl.
  CPC ............ *H04W 4/70* (2018.02); *H04W 12/06* (2013.01); *H04W 12/08* (2013.01); *H04W 4/02* (2013.01)

(56) References Cited

OTHER PUBLICATIONS

"International Search Report and Written Opinion Issued in PCT Application No. PCT/US2018/017731", dated May 28, 2018, 11 Pages.

Suominen, Ilpo, "Access Control for Internet of Things", Retrieved From: https://www.intopalo.com/blog/2015-05-25-access-control-for-internet-of-things/, Retrieved Date: May 15, 2018, 4 Pages.

Varadharajan, Vijayaraghavan et al, "Data Security and Privacy in the Internet of Things (IoT) Environment", Feb. 2016, 21 pages.

Bai, et al., "Context-aware usage control for web of things", In Journal of Security and Communication Networks, vol. 7, Issue 12, Dec. 2014, pp. 2696-2712.

Lee, et al., "A Location Temporal Based Access Control Model for IoTs", In Proceedings of AASRI Conference on Parallel and Distributed Computing and Systems, vol. 5, 2013, pp. 15-20.

Habib, et al., "Context-Aware Authentication for the Internet of Things", In Proceedings of Eleventh International Conference on Autonomic and Autonomous Systems, May 24, 2015, pp. 134-139.

Macvittie, Lori, "ABAC not RBAC: Welcome to the (IoT) World of Contextual Security", https://f5.com/about-us/blog/articles/abac-not-rbac-welcome-to-the-iot-world-of-contextual-security, Published on: Sep. 7, 2015, 2 pages.

"Ubiquitous, Secure Internet-of-Things with Location and Context-Awarness", https://distrinet.cs.kuleuven.be/research/projects/BUTLER, Retrieved on: Feb. 14, 2017, 2 pages.

* cited by examiner

CONTEXT-AWARE DEVICE PERMISSIONING FOR HIERARCHICAL DEVICE COLLECTIONS

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include sensors in buildings and factory machines, sensors and actuators in remote industrial systems, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to communications in an IoT environment. For example, such technology is usable in IoT device permissioning. In one example of the technology, metadata that is associated with a plurality of IoT devices may be stored. The metadata may include a plurality of categories associated with the plurality of IoT devices. At least a first category of the plurality of categories may be hierarchical such that the first category includes at least two hierarchical levels, with each hierarchical level including at least two categories, and such that each category in a hierarchical level that is below another hierarchical level is a subset of one of the categories in the hierarchical levels above that hierarchical level. User information associated with a plurality of users may be stored. A request associated with one of the plurality of users and further associated with access to at least one of the plurality of IoT devices may be received. Responsive to the request, the access is selectively granted to the at least one of the plurality of IoT devices based upon the stored user information and the stored metadata.

In examples of the disclosure, a dynamic, context-aware model may be used for creating device collections based on context attributes which is scalable and flexible. Permissioning the IoT devices (e.g., defining permissions for the IoT devices) may then be defined based on a collection of context parameters allowing configuration of permission models by varying context parameters. Some of the context attributes may be hierarchical.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
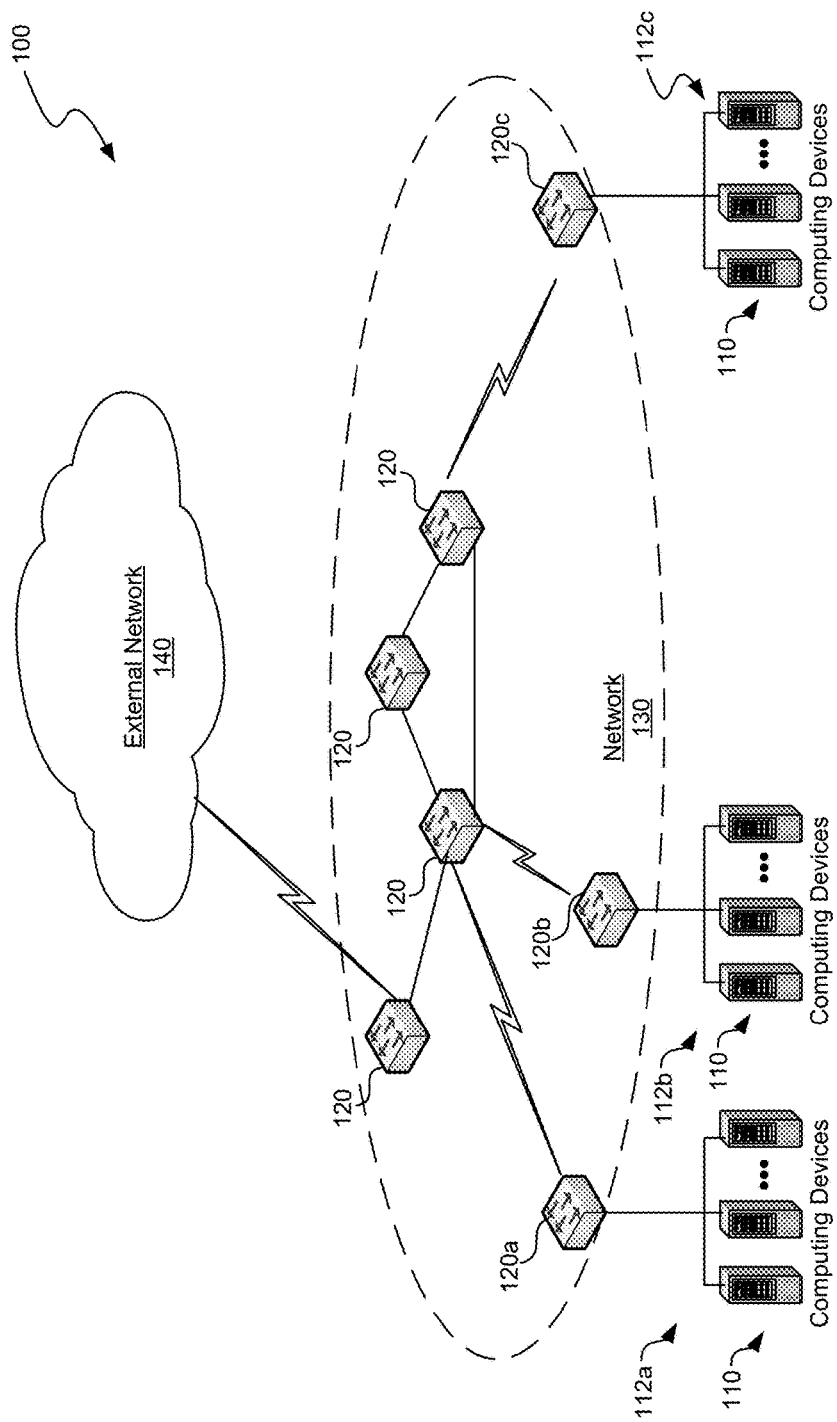
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. IoT data refers to data collected by and/or stored in IoT devices, including telemetry data and other types of data. A declarative request or declarative query is a request or query that is referentially transparent, meaning that the request is unchanged regardless of whether the input used is a reference or an actual value that the reference is pointing to. In essence, a declarative query specifies what information is being requested but does not specify how the query is to be answered.

Briefly stated, the disclosed technology is generally directed to communications in an IoT environment. For example, such technology is usable in IoT device permissioning. In one example of the technology, metadata that is associated with a plurality of IoT devices may be stored. The metadata may include a plurality of categories associated with the plurality of IoT devices. At least a first category of the plurality of categories may be hierarchical such that the first category includes at least two hierarchical levels, with each hierarchical level including at least two categories, and such that each category in a hierarchical level that is below another hierarchical level is a subset of one of the categories in the hierarchical levels above that hierarchical level. User information associated with a plurality of users may be stored. A request associated with one of the plurality of users and further associated with access to at least one of the plurality of IoT devices may be received. Responsive to the request, the access is selectively granted to the at least one of the plurality of IoT devices based upon the stored user information and the stored metadata.

IoT devices are typically deployed in large numbers and in unattended locations. Further, the environments in which these devices exist typically change frequently. Access control privileges granted to users or other computing agents to access an IoT device may be dictated by where the device is at any one moment, and/or by other context parameters. Typically, access permissions on IoT devices are static, similar to the manner in which information technology (IT) resources are controlled. This may create a huge overhead of managing these large number of IoT devices.

In examples of the disclosure, a dynamic, context-aware model may be used for creating device collections based on context attributes which is scalable and flexible. Permissioning the IoT devices may then be defined based on a collection of context parameters allowing configuration of permission models by varying context parameters. Some of the context attributes may be hierarchical. In one example, the context attributes for a device include location, device type, and device operating system ("OS") version, and the location is hierarchical. One example of a hierarchical context attribute is defining location of an IoT device by city, building, floor, and room.

In this example, "city" is the top level of the location hierarchy. In this example, underneath "city" in the location hierarchy is building. In this example, every IoT device in a particular building is also in the city in which the building resides. Similarly, every IoT device on a particular floor belongs to the building in which the floor resides and in the city in which the building resides. Similarly, in this example, every IoT device in a particular room belongs to the floor in which the room resides, and so forth. In this way, in this example, the location metadata is hierarchical. In this example, when the room in which the IoT device resides is assigned, then based on how the hierarchical category is defined, the floor, building, and city are also defined. Permissioning may be defined based on the hierarchical categories. For example, a particular user may be granted a particular type of access to all of the IoT devices in a particular building.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a gateway device, a device that comprises part or all of an IoT support service, a device comprising part or all of a cloud back-end, or the like, as discussed in greater detail below.

Illustrative Computing Device

Figure 2:
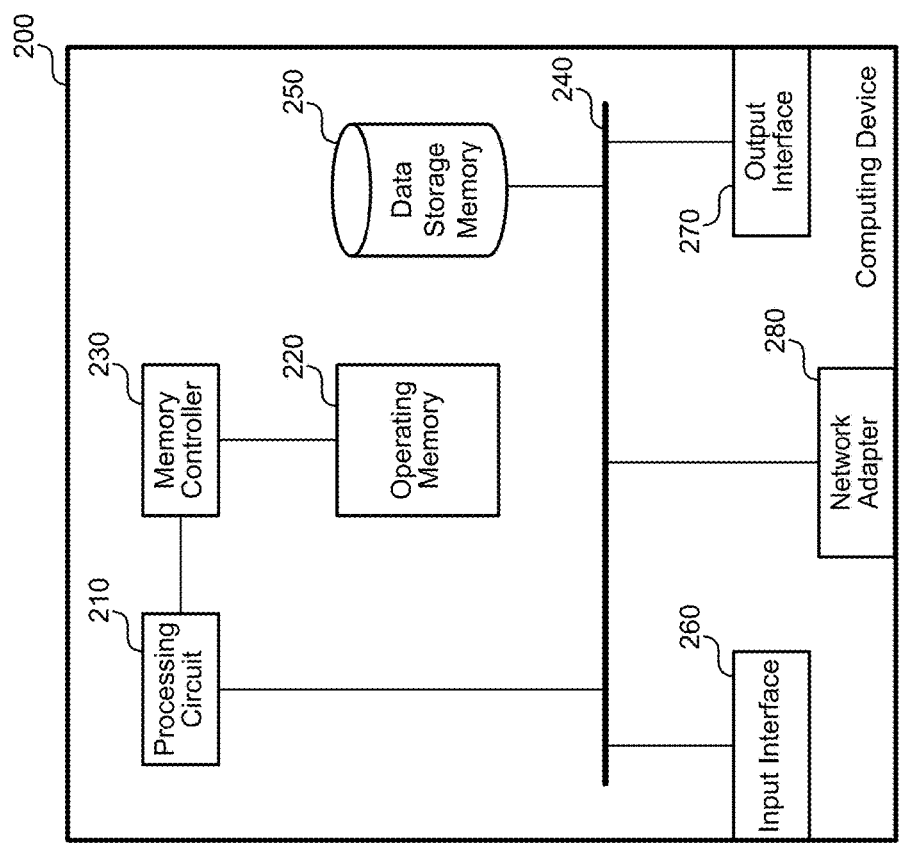
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions. In some examples, computing device 200 is enabled to perform actions such as the actions in the process of FIGS. 4A-4B, or actions in a process performed by one or more of the computing devices in FIG. 3 below.

Illustrative Systems

Figure 3:
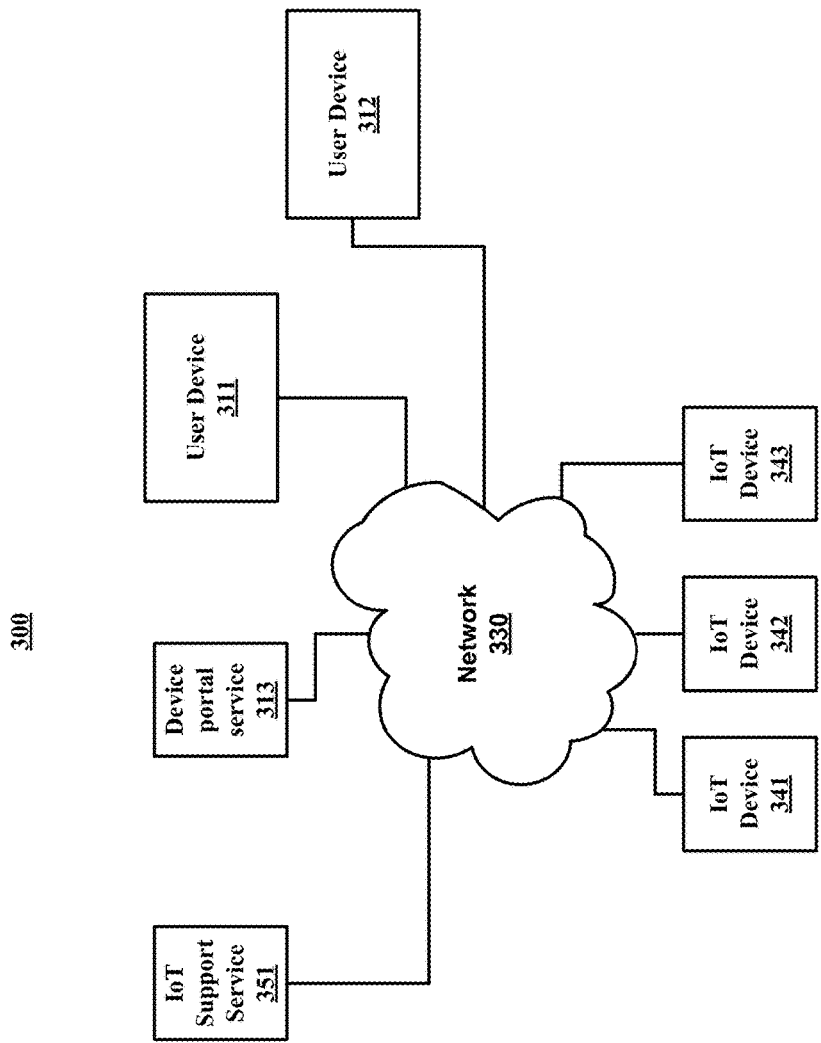
FIG. 3 is a block diagram illustrating an example of a system for IoT device permissioning.

FIG. 3 is a block diagram illustrating an example of a system (300) for IoT data control. System 300 may include network 330, IoT support service 351, IoT devices 341-343, user devices 311 and 312, and device portal service 313, which all connect to network 330. Device portal service 313 includes one or more devices that provide a device portal.

The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. IoT devices may also include devices such as microcontrollers, passive device such as Radio-Frequency Identification (RFID) circuits, circuits powered by magnetic fields, and/or the like. The IoT services for the IoT devices can be used for device automation, data capture, providing alerts, personalization of settings, and numerous other applications.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341-343, user devices 311 and 312, and/or the devices that comprise IoT support service 351 and/or device portal service 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network maybe, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Network 330 may include LoRa, SigFox, and/or or NarrowBand IoT (NB-IoT) networks and/or the like in either regulated and unregulated radio frequency (RF) spectrums. Some IoT devices may be connected to a user device via a different network in network 330 than other IoT devices. In essence, network 330 includes any communication method by which information may travel between IoT support service 351, IoT devices 341-343, user devices 311 and 312, and device portal service 313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by the IoT support service, which, in some examples, includes one or more IoT support services, such as IoT support service 351. Device portal service 313 includes a device or multiple devices that perform actions in providing a device portal to users of IoT devices.

Device portal service 313 is a service which may be used by users of IoT devices to manage IoT services for IoT devices including IoT device 341. User devices 311 and 312 are devices that may each be used by a user for functions including network communication by a user, including network communications with device portal service 313 to manage IoT services for IoT devices including IoT device 341.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4A:
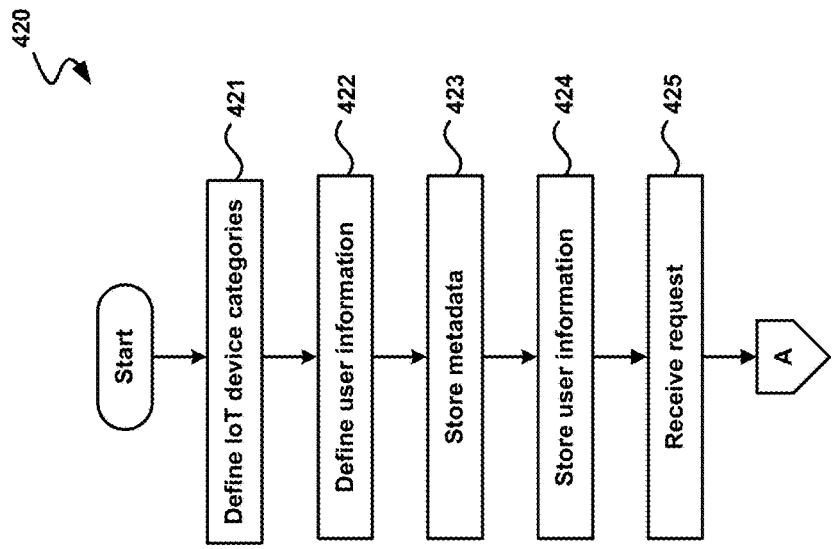
FIGS. 4A-4B are a diagram illustrating an example dataflow for a process for IoT device permissioning, in accordance with aspects of the present disclosure.
Figure 4B:
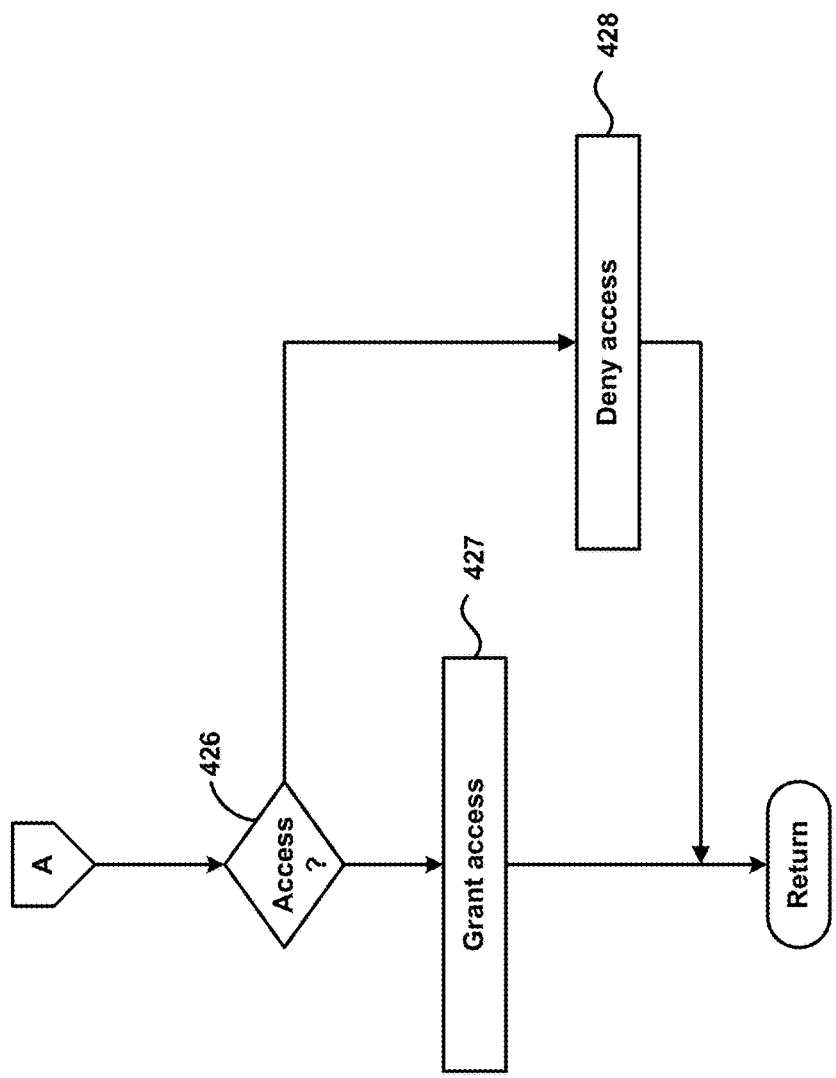

FIGS. 4A-4B are a diagram illustrating an example dataflow for a process (420) for IoT device permissioning. FIGS. 4A-4B and the corresponding description of FIGS. 4A-4B in the specification illustrate an example process for illustrative purposes that do not limit the scope of the disclosure. In some examples, the process of FIGS. 4A-4B is performed by an IoT support service, such as IoT support service 351 of FIG. 3

In the illustrated example, first, step 421 occurs. At step 421, categories associated with IoT device may be defined. At least one of the categories may be hierarchical such that the first category includes at least two hierarchical levels, with each hierarchical level including at least two categories, and such that each category in a hierarchical level that is below another hierarchical level is a subset of one of the categories in the hierarchical levels above that hierarchical level. In some examples, the categories are IoT device context attributes.

The IoT device context attributes may include, for example, location, device type (e.g. temperature sensor, humidity sensor, occupancy sensor), OS version, device state (e.g., online, offline), output value, and/or the like.

As previously discussed, one or more of the IoT device context attributes may be hierarchical. One example of a hierarchical context attribute is defining location of an IoT device by city, building, floor, and room. In this example, city is the top level of the location hierarchy. Further, in this example, underneath city in the location hierarchy is building. In this example, every IoT device in a particular building is also in the city in which the building resides. Similarly, in this example, every IoT device on a particular floor belongs to the building in which the floor resides and in the city in which the building resides. Similarly, in this example, every IoT device in a particular room belongs to the floor in which the room resides, and so forth. In this way, in this example, the location metadata is hierarchical. In this example, when the room in which the IoT device resides is assigned, then based on how the hierarchical category is defined, the floor, building, and city are also assigned.

Although examples in which location is hierarchical are discussed above, one or more context attributes other than or in addition to location may also be hierarchical. For instance, in some examples, there is a hierarchy that describes the physical connection between device, as with gateways that enable connectivity and protocol translation for downstream devices.

As shown, step 422 occurs next in some examples. In step 422, user information may be defined. In some examples, the user information defines permissions for users. The permissions may be defined based on which IoT devices a user has access privileges, as defined by IoT device context attribute, and for each category of IoT device for which the user has access privileges, what type of access privilege is granted. For example, possible access privileges include read, write, update, restart, and/or the like.

In some examples, permissioning includes not just permissioning for the device itself, but may instead or in addition also include permission for data in the device. For instance, in some examples, different applications on a device have configuration data that is provided through the cloud (by back-end applications, e.g. an operator portal), and permissions are used to control access to this configuration that is used by different software running in a single device.

As shown, step 423 occurs next in some examples. In step 423, metadata that is associated with a plurality of IoT devices may be stored. The metadata includes a plurality of categories (e.g., as previously defined at step 421) associated with the plurality of IoT devices. As previously discussed, in some examples, the categories are IoT device context attributes. The metadata may also include device collections in which IoT devices are grouped together based on one or more device context attributes.

In some examples, each time a new IoT device is provisioned, metadata associated with the new IoT device is stored, including a value for each of the IoT device context attributes associated with the IoT device. If any of the values should be changed for an IoT device already having these values, for example based on a changed context, then, in some examples, the corresponding IoT device context attribute in the metadata for that IoT device is changed.

For instance, in some examples, if the location of the device changes, then the corresponding IoT device context attribute for location in the metadata for that IoT device stored in the IoT support service is changed accordingly. Similarly, in some examples, if the OS version of an IoT devices changes, then the corresponding IoT device context attribute for OS version in the metadata for that IoT device stored in the IoT support service is changed accordingly. In some examples, some of the IoT device context attributes, such as location, may change frequently for some of the IoT devices. In some examples, the IoT device context attributes are real-time attributes kept up-to-date dynamically in a scalable and flexible context-aware manner.

In some examples, some or all of the attributes may be determined based on sensors on the IoT devices themselves, such as from a GPS or from sensor(s) and/or hardware on the IoT devices. The IoT devices can then communicate this information and send it to the IoT support service, and the IoT support service can then set or update the IoT device context attributes in the metadata stored in the IoT support service based on the information received from the IoT devices. In some examples, some or all of the metadata is not stored in the IoT support service itself, but instead the IoT support service causes the metadata to be stored in one or more external devices that the IoT support service has access to. In some examples, the IoT support service receives context information from at least a portion of the plurality of IoT devices, and updates the stored metadata based on the received context information.

One example of IoT device context attributes stored for a number of IoT devices is presented as follows.

An IoT device D1 has the following attributes:
Location=Redmond, Wash.
Sub-location=Building 43
Type of sensor=Temperature sensor
Device OS version=1.99
Device D2 has the following attributes:
Location=Redmond, Wash.
Sub-location=Building 43
Type of sensor=Occupancy sensor Device OS version=1.99
Device D3 has the following attributes:
Location=Redmond, Wash.
Sub-location=Building 43
Type of sensor=Humidity sensor
Device OS version=1.99
Device D4 has the following attributes:
Location=Redmond, Wash.
Sub-location=Building 50
Type of sensor=Humidity sensor
Device OS version=1.99
Device D5 has the following attributes:
Location=Redmond, Wash.
Sub-location=Building 50
Type of sensor=Humidity sensor
Device OS version=1.99

The above devices can form the following device collections for ease of administration and permissioning. In some examples, these collections are automatically updated over time as IoT device context attributes change, so that the collection are real-time device collections.

Collection 1: D1, D2, D3 are grouped together because they are in Building 43, though they are different types of sensors Collection 2: D3, D4, D5 form a collection because they are all humidity sensors, though in different buildings Collection 3: D1, D2, D3, D4, D5 are all in another device collection because they are in Redmond.

The example illustrated above is but one example. In other examples, in addition to attributes like location, device type, and operating system, additional IoT device context attributes may also be used, such as device state, output value, and/or the like. Also, while the above example shows a hierarchical location value with two levels (city and building) in the hierarchy, in other examples, the location attribute may have more than two levels in the hierarchy. Also, in some examples, one or more attributes other than location may be hierarchical.

As shown, step 424 occurs next in some examples. In step 424, user information (e.g., as defined in step 422) associated with a plurality of users may be stored.

For instance, the user information may include permissions for each user stored in the IoT support service. When a new user is created, any permissions associated with that user may also be stored. The user information may include, for each user, which IoT devices the user has access privileges to, as defined by IoT device context attributes, and for each category of device the user has access to, which type of access privilege(s) the user has. For instance, the access privileges may include read, write, update, restart, and/or the like for any particular category of IoT device that the user has access to. In some examples, the user information includes, for at least one user of the plurality of users, a collection of IoT devices that is based on at least one category of the plurality of categories, and further includes at least one access right for the collection of IoT devices, including at least one of read access, write access, update access, or restart access.

For instance, using the example Collections 1-3 discussed above, permission to reset Collection 1 can be granted to a user. Similarly, permission to all humidity sensors can be granted to a particular user by using Collection 2.

There are a number of different types of permissions that can be granted to particular users depending on the context. For example, a receptionist for a particular building may be granted read access to all devices in that particular building. A particular user may be responsible for temperature sensor updates in a particular city, and may accordingly be granted update access to all temperature sensors in that city. In some examples, some users with update rights are only granted access to devices in rooms in which the occupancy is zero, as indicated by the output of the occupancy sensor that room. Some access rights may be contingent on whether the device is online or offline.

As shown, step 425 occurs next in some examples. In step 425, a request associated with one of the plurality of users and further associated with access to at least one of the plurality of IoT devices may be received. The request may (in order to be granted) require the user to have some particular type of access privilege, such as read, write, update, and/or restart privileges. In some examples, the request may be a request from a user via a device portal service, such as device portal service 313 of FIG. 3. In some examples, the request may be from an applications program interface (API) call. In some examples, the request may come from an IoT device when a user attempts to directly perform an action associated with the device, including direct physical interaction with the IoT device. In some examples, the request at step 425 encompasses requests requiring some kind of access right based on an action attempted by a user online, such as a remote access request, and also based on action attempted by a user acting directly with the physical IoT device.

As shown, decision block 426 occurs next in some example. At decision block 426, a determination is made as to whether the user associated with the request has the appropriate access privileges for the request to be completed. In some examples, the determination is based upon the stored user information and the stored metadata. For instance, in the previous example involving Collection 1-3, if a user has reset access to Collection 1, and the user attempts to use a device portal service (e.g., 313 of FIG. 3) to reset device D2, the determination would be positive.

If the determination at decision block 426 is positive, the process proceeds to block 427. At block 427, the requested access is granted. The process may then advance to a return block, where other processing is resumed.

If the determination at decision block 426 is negative, the process proceeds to block 428. At block 428, the requested access is denied. The process may then advance to a return block, where other processing is resumed.

In this way, at blocks 426-428, responsive to the request, access is selectively granted to the at least one of the plurality of IoT devices based upon the stored user information and the stored metadata.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
an IoT support service including one or more devices, the devices including at least one memory adapted to store run-time data for the devices, and at least one processor that is adapted to execute processor-executable code that, in response to execution, enables the IoT support service to perform actions, including:
storing metadata that is associated with a plurality of IoT devices, wherein the metadata includes a plurality of categories associated with the plurality of IoT devices, and wherein at least a first category of the plurality of categories is hierarchical such that the first category includes at least two hierarchical levels, each hierarchical level includes at least two categories, and such that each category in a hierarchical level that is below another hierarchical level is a subset of one of the categories in the hierarchical levels above the hierarchical level;
storing user information associated with a plurality of users;
receiving a request associated with one of the plurality of users and further associated with access to at least one of the plurality of IoT devices;
responsive to the request, selectively granting the access to the at least one of the plurality of IoT devices based upon the stored user information and the stored metadata;
receiving context information from at least a portion of the plurality of IoT devices; and
updating the stored metadata based on the received context information.

2. The apparatus of claim 1, wherein at least one of the categories is at least one of location, device type, operating system version, device state, or output value.

3. The apparatus of claim 1, wherein the user information includes, for at least one user of the plurality of users, a collection of IoT devices that is based on at least one category of the plurality of categories, and further includes at least one access right for the collection of IoT devices, including at least one of read access, write access, update access, or restart access.

4. The apparatus of claim 1, wherein the request that is associated with the user results from direct physical interaction with the IoT device.

5. The apparatus of claim 1, wherein the request that is associated with the user is a remote access request.

6. The apparatus of claim 1, wherein the first category is location.

7. The apparatus of claim 6, wherein the hierarchical levels of the first category include city, building, and floor.

8. A method for Internet of Things (IoT) authentication, comprising:
for a plurality of IoT devices, establishing a plurality of categories associated with the plurality of IoT devices, and wherein at least a first category of the plurality of categories is hierarchical such that the first category includes at least two hierarchical levels, each hierarchical level includes at least two categories, and such that each category in a hierarchical level that is below another hierarchical level is a subset of one of the categories in the hierarchical levels above the hierarchical level;
for a plurality of users, establishing user information associated with the plurality of users;
responsive to a request that is associated with a user of the plurality of users and further associated with access to at least one of the plurality of IoT devices, via at least one processor, selectively granting the access to the at least one of the plurality of IoT devices based upon the plurality of categories and the user information;
receiving context information from at least a portion of the plurality of IoT devices; and
updating the plurality of categories based on the received context information.

9. The method of claim 8, wherein at least one of the categories is at least one of location, device type, operating system version, device state, or output value.

10. The method of claim 8, wherein the user information includes, for at least one user of the plurality of users, a collection of IoT devices that is based on at least one category of the plurality of categories, and further includes at least one access right for the collection of IoT devices, including at least one of read access, write access, update access, or restart access.

11. The method of claim 8, wherein the request that is associated with the user results from direct physical interaction with the IoT device.

12. The method of claim 8, wherein the request that is associated with the user is a remote access request.

13. The method claim 8, wherein the first category is location.

14. The method of claim 13, wherein the hierarchical levels of the first category include city, building, and floor.

15. A processor-readable storage medium, having stored thereon process-executable code, that, upon execution by at least one processor, enables actions, comprising:
storing a plurality of context attributes associated with a plurality of IoT devices, wherein the context attributes are associated with the plurality of IoT devices, and wherein at least a first context attribute of the plurality of context attributes is hierarchical such that the first category includes at least two hierarchical levels, each hierarchical level includes at least two categories, and such that each category in a hierarchical level that is below another hierarchical level is a subset of one of the categories in the hierarchical levels above the hierarchical level;
storing permissions associated with a plurality of users;
receiving a request associated with a user of the plurality of users and further associated with access to at least one of the plurality of IoT devices;
responsive to the request selectively granting the access to the at least one of the plurality of IoT devices based upon the stored permissions and the stored plurality of context attributes;
receiving context information from at least a portion of the plurality of IoT devices; and
updating the stored plurality of context attributes based on the received context information.

16. The processor-readable storage medium of claim 15, wherein at least one of the context attributes of the plurality of context attributes is at least one of location, device type, operating system version, device state, or output value.

17. The processor-readable storage medium of claim 15, wherein the stored permissions include, for at least one user of the plurality of users, a collection of IoT devices that is based on at least one context attribute of the plurality of context attributes, and further includes at least one access right for the collection of IoT devices, including at least one of read access, write access, update access, or restart access.

* * * * *